United States Patent [19]

Cocke, Jr. et al.

[11] Patent Number: 4,748,939
[45] Date of Patent: Jun. 7, 1988

[54] APPARATUS FOR APPLYING PESTICIDES TO LIVESTOCK

[75] Inventors: Jesse Cocke, Jr., Stephenville, Tex.; William J. Gladney, Kansas City, Mo.; Alan K. Viets, Baton Rouge, La.

[73] Assignee: Texas A&M University System, College Station, Tex.

[21] Appl. No.: 887,344

[22] Filed: Jul. 21, 1986

[51] Int. Cl.$^4$ .............................................. A01K 29/00
[52] U.S. Cl. ....................................... 119/157; 239/51
[58] Field of Search .................... 119/157; 239/44, 46, 239/47, 51; 43/132.1

[56] References Cited

U.S. PATENT DOCUMENTS

| | | | |
|---|---|---|---|
| 239,266 | 3/1881 | Newth | 222/187 |
| 908,508 | 1/1909 | Sholes | 239/151 |
| 987,433 | 3/1911 | Crawford | 119/157 |
| 1,053,019 | 2/1913 | Erickson | 119/157 |
| 1,129,977 | 3/1915 | Hagny | 119/157 |
| 1,184,438 | 5/1916 | Gamble et al. | 119/157 |
| 1,360,007 | 11/1920 | Morrison | 119/157 |
| 2,507,899 | 5/1950 | Gilowitz | 239/44 |
| 2,581,028 | 1/1952 | Kirk | 119/157 |
| 2,702,020 | 2/1955 | Worden | 119/157 |
| 2,998,803 | 9/1961 | Worden . | |
| 3,071,111 | 1/1963 | Hamilton | 119/157 |
| 3,116,717 | 1/1964 | Ragsdale | 119/157 |
| 3,118,427 | 1/1964 | Stanzel | 222/187 |
| 3,285,231 | 11/1966 | Johnson | 119/157 |
| 3,524,433 | 8/1970 | Sampson | 119/157 |
| 3,747,902 | 7/1973 | Bailey | 239/44 X |
| 4,023,532 | 5/1977 | Goodwin | 119/157 |
| 4,287,722 | 9/1981 | Gilmore . | |
| 4,309,842 | 1/1982 | Jones | 119/157 |
| 4,324,202 | 4/1982 | Stonestreet et al. | 119/157 |
| 4,430,961 | 2/1984 | Steckel | 119/157 |
| 4,506,630 | 3/1985 | Hair | 119/157 |

OTHER PUBLICATIONS

"Fli-Flick" Livestock Pesticide Applicator, Jesse Cocke, Jr., Extension Entomologist, PhD, ARPE Texas A&M Research and Extension Center, Stephenville, TX 76401, pp. 1-3 w/19 pages of pictures and graphs.
"Old Scratch" Cattle Oiler-Delouser, 4 page Brochure by Old Scratch, Inc.

*Primary Examiner*—David A. Scherbel
*Assistant Examiner*—Creighton Smith
*Attorney, Agent, or Firm*—Arnold, White & Durkee

[57] ABSTRACT

A device is described for applying pesticide to livestock which includes a vertical cylindrical reservoir and a wick positioning assembly. Wicks extend from the reservoir up through the wick positioning assembly and dangle down outside the reservoir to a level low enough so that they can brush against livestock walking beneath the device. When a liquid pesticide composition is placed in the reservoir, wicking action will carry the pesticide through the wicks and apply it to the livestock as they contact the wicks.

3 Claims, 3 Drawing Sheets

4,748,939

APPARATUS FOR APPLYING PESTICIDES TO LIVESTOCK

BACKGROUND OF THE INVENTION

This invention relates to controlling ectoparasites on livestock. More specifically, it concerns apparatus for applying pesticides to livestock to help control ectoparasites.

Ectoparasites such as flies, ticks and lice are a major nuisance to livestock and a costly problem to those in the business of raising and selling livestock. The bites which they inflict can transmit disease, cause weight loss through irritation and blood loss, and cause reduced milk production in dairy cattle. This problem has been recognized for many years, and many attempts have been made to overcome it, or to at least control the quantity of ectoparasites that attack livestock.

One device that has been used in the past to help combat this problem is a plastic ear tag impregnated with insecticide. Unfortunately, insecticidal ear tags usually release insecticides at rates that decrease as time passes. In addition, if parasites build up a resistance to the particular insecticide in the tag; this resistance can not be combatted without placing a new tag containing a different insecticide on the animal. In this sense, ear tags have less flexibility than would be desirable.

Dust bags and back rubbers which contain insecticidal material have also been used in the past. They are also subject to a number of problems, such as poor operation in wet weather, relatively rapid deterioration, difficult maintenance, vulnerability to destruction by weather and contact from animals, and unpredictable operation, which leads to less than optimal long-term pest control. Further, dust bags and back rubbers do not lend themselves to accommodating rapid changes in the type of pesticide applied.

Some devices have also been used in the past in which wicks are used to transport insecticide in liquid form to animals. However, such wicking devices have not always been entirely satisfactory.

In general, devices previously used to apply insecticide to livestock have been relatively expensive, had limited versatility, been vulnerable to damage from weather and animals, released unpredictable amounts of pesticide, and required replacement more frequently than desirable. They have also been less than optimum in terms of maintenance, durability, ease of use (including ability to be relocated), versatility, and sureness of use. A need has existed for many years and continues to exist for an improved apparatus which can apply metered quantities of pesticides to livestock in a way that will provide good long-term control of ectoparasites.

SUMMARY OF THE INVENTION

A device for applying pesticide to livestock in accordance with the present invention can include a vertical cylindrical reservoir, a wick positioning assembly, and a plurality of wicks. The vertical cylindrical reservoir is adapted to hold pesticide compositions and has an open top. The wick positioning assembly fits on top of the reservoir and has a plurality of apertures in its outer perimeter. One end of each wick extends through an aperture in the wick positioning assembly and hangs down into the reservoir. The other end of each wick hangs down outside the reservoir to an elevation lower than the bottom of the reservoir. The device can also include means for preventing the wicks from sliding further in or out of the apertures in the wick positioning assembly, and means for suspending the device at a selected height above a path where livestock will walk.

Devices in accordance with the present invention are intended to be suspended above paths where livestock will walk, so that the wicks hanging down will brush against the livestock. When the reservoir is filled with liquid pesticide, wicking action will carry the pesticide to the ends of the wicks, where it will be transferred to the livestock as they brush against the wicks. One example of a location where devices in accordance with present invention could be used is exit walkways in dairy barns. Several devices in accordance with the present invention could be used above the same walkway to apply several different pesticides to livestock.

The present invention has a number of advantages over devices used previously. New pesticides can easily be added to the reservoir, so it is easy to change pesticides if parasites build up a resistance to the one to which they are currently being exposed. The devices are also durable, which will enable them to resist extreme weather and harsh treatment by livestock. The devices have also been found to provide a predictable and relatively constant release of pesticide in terms of flow rate. This will not only conserve pesticide and reduce the operating expense of these devices, but will also minimize environmental contamination. Furthermore, the relative constancy of the release rate may help avoid the buildup of resistance to the pesticide. Ear tags, which have an ever-decreasing release rate, are subject to the resistance problem.

Because of the simplicity of construction of the devices, they are essentially maintenance-free. They are also extremely versatile and easy to install and use. They can be combined with other pest control techniques such as ear tags, sprays, or feed additives. Further, devices in accordance with the present invention can apply pesticide to livestock without requiring the animals to be worked in chutes or head gates, which require a significant amount of labor and place an undesirable amount of stress on the animals, resulting in loss of weight and/or milk production.

DETAILED DESCRIPTION OF SPECIFIC EMBODIMENTS

Devices in accordance with the present invention can take several forms. Two specific embodiments will be described in detail.

Figure 1:
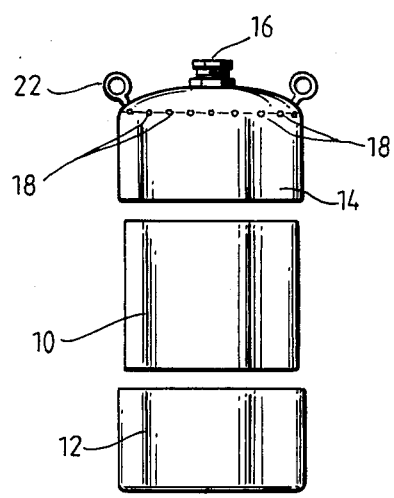
FIG. 1 is an exploded side view of a device in accordance with the present invention.
Figure 2:
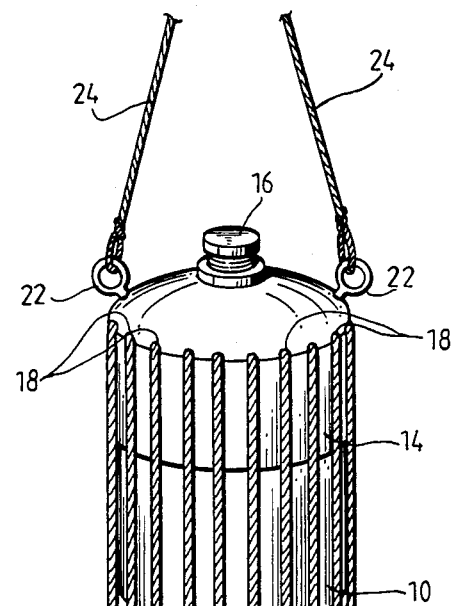
FIG. 2 is a perspective view of the device of FIG. 1 when assembled.
Figure 3:
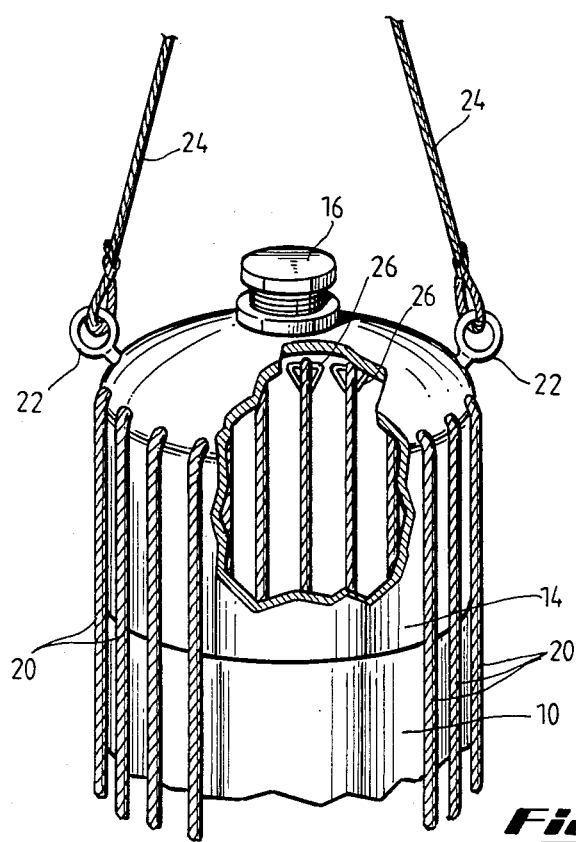
FIG. 3 is a cut-away view of the device of FIGS. 1 and 2.

A first embodiment is shown in FIGS. 1-3. FIG. 1 shows several of the major components in unassembled form. A vertical cylindrical reservoir 10 is sealed at the bottom by a cylindrical cap 12. A wick positioning assembly in the form of a reservoir cap member 14 is adapted to seal the top of the reservoir 10. A removable plug 15 is located in the top of the reservoir cap member 14 in order to allow the addition of liquid pesticide compositions. A plurality of apertures 18 are located around the circumference of the reservoir cap member 14. In this particular embodiment, they are spaced an equal distance apart and are all located in the same horizontal plane. Each aperture 18 is adapted to allow a wick to pass through it.

FIG. 2 shows this same device in assembled form. The vertical cylindrical reservoir 10, cap 12, and reservoir cap member 14 have been joined together to form an enclosed reservoir. A plurality of wicks 20 extend through the apertures 18 in the reservoir cap member 14 and downward to a level beneath the bottom of the cap 12. A pair of eye screws 22 are located on opposite sides of the reservoir cap member 14. Ropes 24 or the like are attached to the eye screws 22 and are used to suspend the device from some fixed support above locations frequented by the animals to be treated. By adjusting the length of the support ropes 24 or of the wicks 20, the device can be adjusted to accommodate livestock of different heights.

FIG. 3 shows the portions of the wicks 20 that extend through the apertures 18 and into the inside of the reservoir 10. The end of each wick 20 that extends inside the device hangs downward so it can soak in the liquid pesticide composition. It will usually be desirable to include means for preventing the wicks 20 from moving further in or out through the apertures 18. These means can suitably be pig rings or stainless steel clips 26.

Devices in accordance with the present invention can be constructed out of a number of different materials. A device as shown in FIGS. 1-3 can suitably be constructed from a length of six inch nominal diameter schedule 40 high pressure PVC pipe. The cap 12 and reservoir cap member 14 can also be constructed of PVC. If the inner diameter of the reservoir 10 is 6 inches (15.2 cm) and the vertical height of the reservoir is 12 inches (30.5 cm), the liquid capacity of the assembled device will be approximately 247.6 cubic inches (4.06 l). The wicks can suitably be ¼ inch diameter nylon ropes, which are cut to a length of about 42 inches (106.7 cm). The end of the wicks 20 that hang down inside the reservoir 10 should be approximately 12 inches (30.5 cm) long, so they will reach all the way to the bottom of the reservoir 10. That would leave approximately 30 inches (76.2 cm) of the wick length to hang outside of the device.

It will often be desirable to drill a small ventilation hole in the removable plug 16. Such a hole will prevent undesirable pressure build-up inside the device, especially if some component of the liquid pesticide composition is volatile.

As an example of how such a device could be used, the support ropes 24 can be used to suspend the device over an exit walkway from a dairy barn so that the bottom of the device will be approximately six inches above the backs of the largest animals that use the walkway. This will allow the portions of the wicks 20 that hang down outside the reservoir 10 to separate and touch an animal walking underneath along its ears and the top of its head, and down its back line and sides.

A variety of liquid pesticide compositions can be used. One suitable example is a mixture of diesel fuel and mineral oil, in a 3:1 volume ratio with a 1% solution of permethrin insecticide. Since the wicking rate will be primarily controlled by the viscosity of the liquid pesticide composition, the greater the percentage of diesel fuel in the mixture, the faster wicking will occur and the more rapidly the pesticide composition in the reservoir will be depleted.

Crotoxyphos, dichlorvos, cyhalothrin, and pirimiphos methyl are examples of other suitable pesticides that could be used. Diluents other than diesel fuel and mineral oil could also be used.

Figure 4:
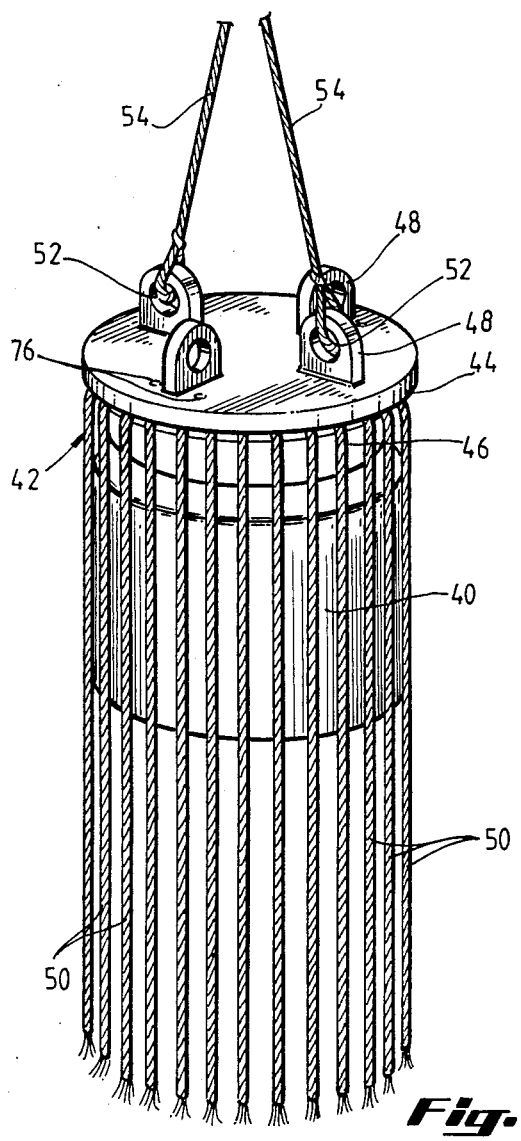
FIG. 4 is a perspective view of another device in accordance with the present invention.

FIGS. 4-11 show a second embodiment of the present invention. FIG. 4 shows the device in assembled form. The device includes a vertical cylindrical reservoir 40 and a wick positioning assembly 42. The wick positioning assembly includes an upper member 44 and a lower member 46. The lower member 46 includes four upward projections 48 which go through the upper member 44 and are used to secure the lower member 46 to the upper member 44. As in the previous embodiment, a plurality of wicks 50 hang downward from the wick positioning assembly 42. The upward projections 48 each have a hole 52. Two or more of the holes 52 can be used with ropes 54 to suspend the device in a desired location.

Figure 5:
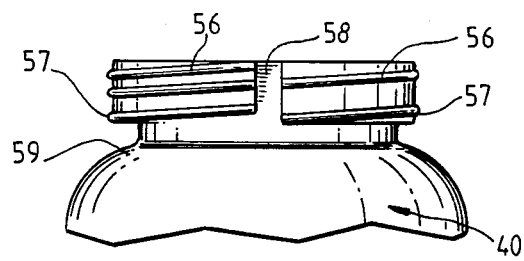
FIG. 5 is a side view of the top of a vertical cylindrical reservoir suitable for use with the device of FIG. 4.
Figure 6:
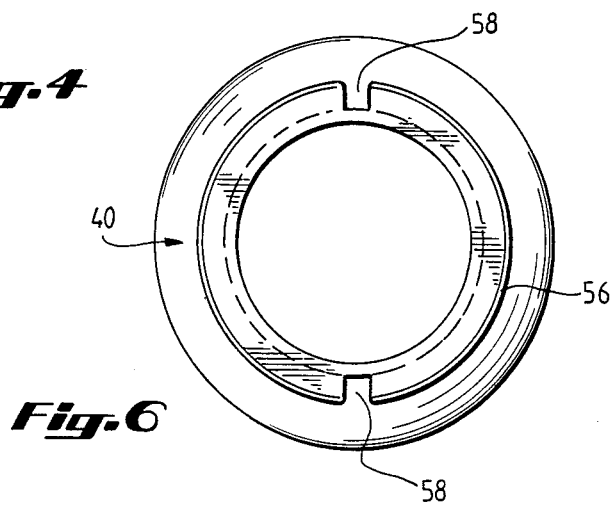
FIG. 6 is a top view of the reservoir neck shown in FIG. 5.

FIG. 5 shows the top neck of the vertical cylindrical reservoir 40. The top includes threads 56 which can engage a cap (not shown) so as to seal the reservoir 40 when it is shipped or stored. The top also includes two vertical slots 58 in the threads, spaced on opposite sides of the top of the reservoir 40. These slots 58 aid in connecting the reservoir 40 to the wick positioning assembly 42. FIG. 6 shows a top view of the threaded neck of the reservoir 40, showing the two slots 58.

Figure 7:
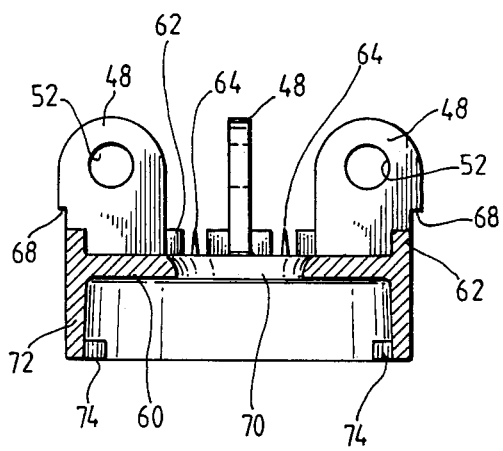
FIG. 7 is a side cross-sectional view of the lower member in a wick positioning assembly in the device of FIG. 4.
Figure 8:
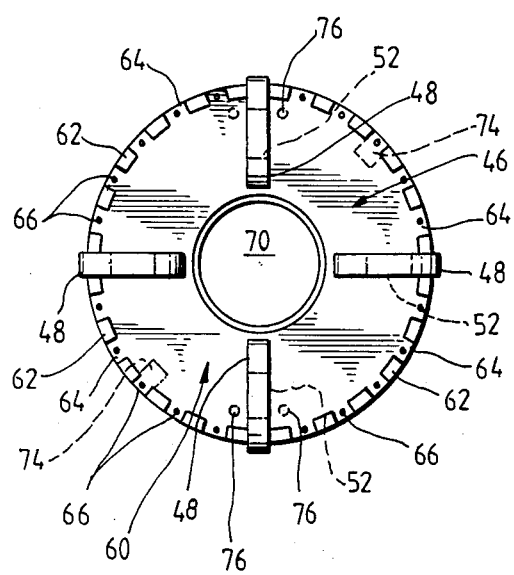
FIG. 8 is a top view of a lower member in a wick positioning assembly in the device of FIG. 4.
Figure 9:
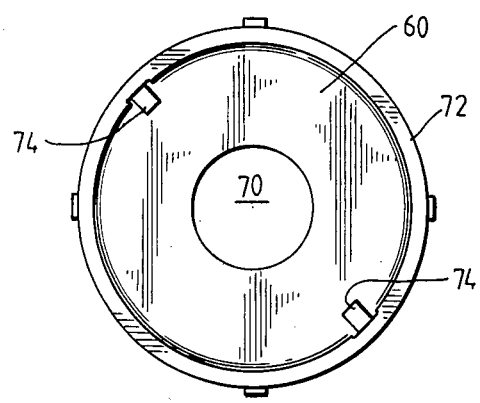
FIG. 9 is a bottom view of the lower member in a wick positioning assembly in the device of FIG. 4.

FIG. 7 shows the lower member 46 of the wick positioning assembly 42 from the side in cross-section. FIG. 8 shows a top view of the lower member 46, and FIG. 9 shows a bottom view. The lower member 46 has a flat circular base 60. Extending upward from the circumference of the base 60 is an upper side wall 62. The upper side wall 62 is periodically interrupted by apertures 64. In the center of each aperture is a vertical pointed spike 66. On top of the base 60 are four upward projections 48 which are spaced 90 degrees from each other around the circular base 60. Each upward projection 48 in this embodiment has a rounded top and straight vertical walls, except for an indentation 68 in the outside edge. The indentation 68 causes the upper part of the projection 48 to extend outward slightly further than the rest of the projection 48. As will be explained in more detail later, the projections 48 with the indentations 68 facilitate joining the lower member 46 to the upper member 44.

In the center of the base 60 is a circular opening 70, which allows wicks to be dipped into the vertical cylindrical reservoir 40. Extending downward from the base 60 around its outer circumference is a lower side wall 72. Unlike the upper side wall 62, the lower side wall 72 is continuous and unbroken by any apertures, and can be threaded on its inner surface.

On the inside of the lower side wall 72 are two horizontal posts 74. The horizontal posts 74 are adapted to fit into the slots 58 on the top of the reservoir 40. As the lower member 46 and the reservoir 40 are positioned together, the posts 74 slide down the slots 58 until they are lower than a thick bottom thread 57. The reservoir is then rotated, with the posts 74 sliding underneath the thick bottom thread 57. At some point in the rotation, the posts 74 will weage between the thick bottom thread 57 and the shoulder 59 of the reservoir 40, thereby firmly fastening the reservoir 40 to the lower member 46.

As can be seen more clearly in FIG. 8, four posts 76 are located on top of the base 60, two being located on each of two opposite sides. The posts 76 are adapted to interfere with posts which are attached to the upper member 44, and will be described subsequently.

Figure 10:
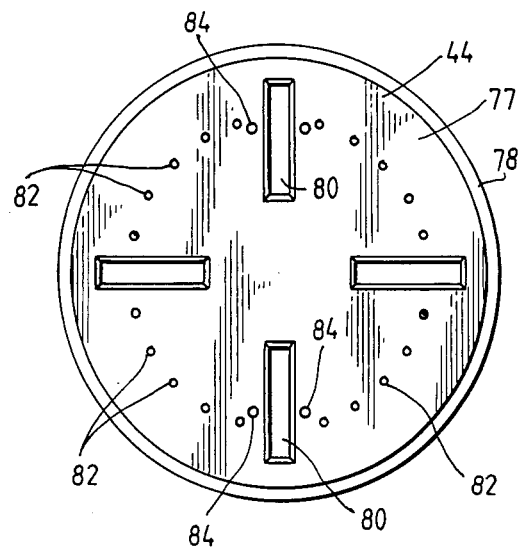
FIG. 10 is a bottom view of the upper member in a wick positioning assembly in the device of FIG. 4.
Figure 11:
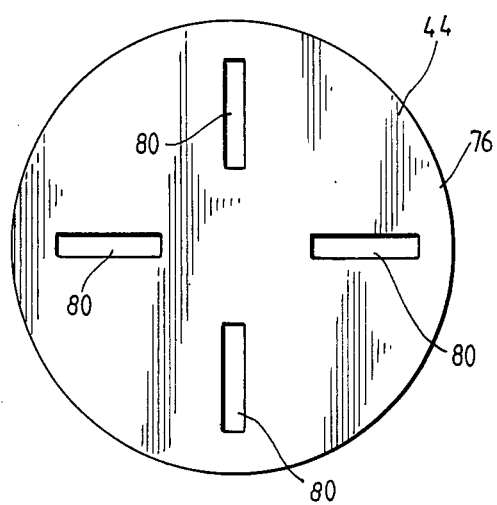
FIG. 11 is a top view of the upper member in a wick positioning assembly in the device of FIG. 4.

FIGS. 10 and 11 show the bottom and top of the upper member 44 respectively. The upper member 44 includes a flat circular top 77 and a vertical side wall 78 which extends downward from the outer circumference of the top 77. There are four rectangular openings 80 in the upper member 44, and the openings 80 are adapted to receive the upward projections 48 on the lower member 46. The walls of the openings 80 instead of being perfectly vertical are preferably bevelled to improve the tightness of the fit of the projections 48 with the openings 80. As can be seen by comparing FIGS. 7 and 10, when the projections 48 are inserted upward through the openings 80, once the indentations 68 are above the top 77 of the upper member 44, a firm connection will exist between the upper member 44 and the lower member 46. Also, the holes 52 in the projections 48 can be used with ropes or the like to suspend the apparatus above a desired location.

The upper member 44 also has a series of downwardly extending vertical spikes 82. In addition, four downwardly extending posts 84 are arranged so they will interfere with the posts 76 on the lower member 46. By so interfering, the posts 76 and 84 will limit the number of relative positions in which the upper member 44 and lower member 46 can be joined. Specifically, the upper member 44 and lower member 46 will have to be positioned relative to each other so that the pairs of posts 76 are each spaced 90° from the pairs of posts 84. If there is some marking on top of the upper member 44, this will help a user judge the position of the reservoir 40 while screwing it in.

Figure 12:
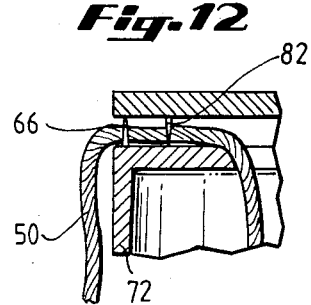
FIG. 12 is a side cross-sectional view of a portion of the upper and lower members in the device of FIG. 4.

When the device is assembled with wicks, one end of each wick extends down through the center opening 70 in the lower member 46 so that it hangs to the bottom of the reservoir 40. Each wick extends outward across the top of the base 60 of the lower member 46. Each wick is impaled both by an upwardly projecting spike 66 on the lower member 46 and a downwardly projecting spike 82 on the upper member 44, as shown in FIG. 12. The two sets of spikes 66 and 82 are preferably arranged so that the lower ones 66 are located slightly closer to the center axis of the device than are the upper ones 82. Whatever the spacing of the spikes from the center axis is chosen to be, by impaling the wicks the spikes help ensure that the wicks will not slide further in or out of the wick positioning assembly 42.

Referring back now to FIG. 4, the remaining ends of the wicks 50 hang downward to a level lower than the bottom of the reservoir 40, so they can brush against animals that walk underneath the device.

To give an idea of suitable dimensions for this second embodiment of the present invention, the upper member 44 can have an outer diameter of approximately 5.7 inches (14.5 cm), the lower member 46 an outside diameter of approximately 4.4 inches (11.2 cm), the top of the reservoir 40 an outer diameter of approximately 3.8 inches (9.7 cm), and the reservoir a capacity of approximately 9 pints (4.3 l). Of course, the dimensions could be varied to any desirable values.

EXAMPLE I

Two devices in accordance with present invention were installed in a dairy barn for testing during the summer and fall. One device was suspended above an exit walkway from the milking parlor, while a second was placed to the side of the walkway in order to study the passive wicking rate with no animals making contact with the device. Both devices were changed with a liquid pesticide composition containing 1% permethrin in mineral oil mixed with diesel fuel, in a 1:3 ratio.

Calibrated capillary tubes on the devices allowed measurement of the change in volume of liquid pesticide composition in the reservoirs. In the device suspended above the walkway, 1665.3 ml of the composition was applied in 4,018 cow treatments over a 42 day test period. This indicates that each animal had available to it on the average 4.0 mg of technical permethrin per treatment, and 8.0 mg per cow per day based on a twice-per-day milking schedule. Control of horn flies appeared to be essentially 100% based on visual observations during the test period.

The depletion rate of the liquid pesticide composition from the device suspended outside the walkway appeared to be more irregular than that from the device suspended above the walkway where it would contact animals leaving the milking parlor. However, the cumulative volume depletion was fairly similar for both devices, with the one that was allowed to drip without contact with animals being somewhat higher. The device hung above the walkway dispensed approximately 400 ml by the 10th day, 800 ml by the 20th day, and 1200 ml by the 30th day in a first test. In a second test, the cumulative depletion for the 10th, 20th, 30th, and 40th days was approximately 550, 1020, 1320, and 1600 ml, respectively.

EXAMPLE II

A device in accordance with the present invention was suspended above an exit walkway from a milking area in a dairy barn. Once again, the device was charged with 1% permethrin in mineral oil mixed with diesel fuel in a 1:3 volume ratio. Over 200 cows were treated twice daily at milking time. Based on visual observations, horn flies were controlled by the devices during spring, summer, and fall.

In addition, after an approximately two-day adjustment period, dairy cows moved through the downwardly hanging wicks without requiring any encouragement from milking employees.

By comparison, a nearby herd or cattle treated with flucythrinate ear tags (available from American Cyanimid) at approximately the same time achieved control of horn flies for only approximately six weeks.

After 10 days, approximately 1,000 ml of liquid pesticide composition had been dispensed by the device. At 20 days, the cumulative amount had reached approximately 1800 ml. In a second trial at the same location, the volume dispensed by the 10th day was approximately 750 ml, while the cumulative volume by the 20th, 30th, 40th and 50th days, respectively, was approximately 1300, 1650, 2100, and 2600 ml.

EXAMPLE III

A device in accordance with the present invention was suspended above a walkway in a dairy barn. Approximately 525 cows were treated three times a day at milking with a liquid pesticide composition like those used in Examples I and II. On average each cow received approximately 2.04 mg of permethrin per day. Visual observation indicated that horn fly control was essentially 100%, and house fly and stable fly problems in the milking parlor were greatly reduced.

The volume depletion of the liquid pesticide composition was approximately 1350 ml after 10 days and 2250 ml after 20 days.

Table 1 shows the mean number of horn flies observed on the dairy cows in Examples I through III, with the first figure in each line representing the day on which treatment with devices in accordance with the present invention began.

TABLE 1

| day | Mean no. hornflies per wet cow | | | | | | | | | |
|---|---|---|---|---|---|---|---|---|---|---|
| | 1 | 2 | 12 | 26 | 41 | 43 | 57 | 74 | 88 | 101 |
| Example I | 300 t | 0 | 0 | 0 | 0 | 0 | 0 | 0 | 4 | 6 |
| Example II | 300 t | 0 | 0 | 0 | 0 | 0 | 0 | 0 | 3 | 2 |
| Example III | — | — | 450 t | 0 | 0 | 0 | 0 | 0 | 0 | 0 |

EXAMPLE IV

A device in accordance with the present invention was suspended over a narrow gap between pastures on a ranch. The beef cattle in the pastures had previously been tagged with flucythrinate ear tags at a rate of one tag per cow prior to placement of the device in accordance with the present invention. After six weeks of use of the ear tags alone, visual observation indicated that each head of cattle was infested with approximately 200–300 horn flies.

After the device in accordance with the present invention was installed containing a 1% permethrin liquid pesticide composition, essentially 100% horn fly control was achieved for the rest of the spring, summer, and fall. The cattle showed no reluctance to walk under the device.

EXAMPLE V

Devices in accordance with the present invention were suspended above two exit walkways from a dairy barn. The devices were charged with a 1% permethrin solution in mineral oil, mixed with diesel fuel in a 1:3 volume ratio. Table 2 shows the volume depletion rates over an approximately seven week period.

TABLE 2

| | days treated | no. cows treated | no. cow treatments | total ml depleted | ml/day depleted | ml/cow/day depleted | mg permethrin/cow/day |
|---|---|---|---|---|---|---|---|
| East exit | 49 | 5163 | 15,489 | 3493 | 71.29 | 0.677 | 6.77 |
| West exit | 49 | 5163 | 15,489 | 3677 | 75.00 | 0.712 | 7.12 |

Based on the three-milkings-per-day schedule, cows from the wet herd using the East exit had available approximately 2.26 mg of technical permethrin per treatment, while for the West exit the figure was approximately 2.37 mg.

For comparison purposes, a dry herd of dairy cattle in a nearby pasture was sprayed with Anchor Permectrin II (available from Anchor Labs) at labelled rates several times during the same period. Table 3 gives the mean number of horn flies (HF), house flies (HOF) and stable flies (SF) per cow on the days indicated after the beginning of treatment.

TABLE 3

| | Wet Herd 1% permethrin | | | Dry Herd (check) sprayed as required | | |
|---|---|---|---|---|---|---|
| day | HF | HOF | SF | HF | HOF | SF |
| 1 | 60 | 60 | 80 | 50 | 50 | 70 |
| 8 | 10 | 10 | 40 | 50 | 50 | 70 |
| 15 | 4 | 4 | 40 | 30 | 70 | 60 |
| 22* | 4 | 10 | 44 | 30 | 30 | 50 |
| 29 | 10 | 10 | 50 | 20 | 30 | 30 |
| 36* | 6 | 8 | 40 | 30 | 30 | 50 |
| 43 | 12 | 12 | 40 | 50 | 50 | 150 |
| 50* | 10 | 10 | 40 | 10 | 10 | 50 |
| 57 | 20 | 20 | 50 | 40 | 50 | 50 |
| 64* | 15 | 15 | 30 | 50 | 40 | 60 |
| 71 | 15 | 15 | 30 | 40 | 50 | 50 |
| 78* | 10 | 15 | 40 | 50 | 40 | 60 |
| 82 | 20 | 20 | 50 | 50 | 40 | 60 |
| 89* | 15 | 20 | 30 | 50 | 60 | 80 |
| 96 | 10 | 15 | 40 | 60 | 50 | 80 |
| 106* | 10 | 30 | 20 | 60 | 50 | 80 |
| 113 | 20 | 20 | 20 | 300 | 100 | 80 |
| 120 | 10 | 20 | 30 | 350 | 100 | 80 |
| 127 | 5 | 15 | 40 | 350 | 100 | 80 |
| Totals | 266 | 329 | 754 | 1670 | 1000 | 1290 |
| Average | 14 | 17 | 40 | 89 | 53 | 68 |

*Dry herd sprayed on these dates with Anchor Permectrin II at labeled rates.

EXAMPLE VI

A device in accordance with the present invention was tested on a herd of dairy cattle with a 1% permethrin liquid pesticide composition as used in the previous examples. Table 4 gives the treatment parameters.

TABLE 4

| | days treated | no. cows treated | no. cow treatments | total ml depleted | ml/day depleted | ml/cow/day depleted | mg permethrin/cow/day |
|---|---|---|---|---|---|---|---|
| First run | 60 | 5735 | 11,470 | 2794.6 | 46.58 | .487 | 4.87 |
| Second run | 70 | 5918 | 11,836 | 2928.0 | 41.82 | .495 | 4.95 |

Table 5 shows the mean number of horn flies per cow on various dates after the initiation of the treatment. Data is also given for a dry heard of diary cattle which was not treated with the device in accordance with the present invention.

TABLE 5

| day | Mean no. hornflies per cow | | | | | | |
|---|---|---|---|---|---|---|---|
| | 1 | 20 | 29 | 52 | 78 | 106 | 143 |
| Milking herd | 300 | 100 | 25 | 10 | 5 | 50 | 25 |
| Dry herd | 300 | 250 | 200 | 50 | 75 | 300 | 200 |

The preceding description concerns specific embodiments of the present invention. Those skilled in the art will recognize that the present invention could take a number of forms, including many variations on the specific embodiments described in this patent.

We claim:

1. A device for applying pesticide to livestock, including:
    a vertical cylindrical reservoir which is adapted to hold liquid pesticide compositions and has an open top;
    a wick positioning assembly which has a plurality of apertures adapted for wicks to extend through, and which comprises:
        a lower member which has a circular base and a vertical side wall extending upward from the base with a circular cross section, and which also has a circular opening in the base to receive the open top of the reservoir, and
        an upper member which has a circular top and a vertical side wall extending downward from the top with a circular cross section, and which is attached to the lower member;
    a plurality of wicks, one end of each wick extending down through the opening in the wick positioning assembly into the reservoir, the other end extending through the apertures in the wick positioning assembly and hanging down outside the reservoir to an elevation lower than the bottom of the reservoir;
    means for preventing the wicks from sliding further in or out of the apertures in the wick positioning assembly; and
    means for suspending the device at a selected height above a path where livestock will walk.

2. The device of claim 1, where the plurality of apertures in the wick positioning assembly are in the side wall of the lower member.

3. The device of claim 1, where the means for preventing the wicks from sliding further in or out of the apertures in the wick positioning assembly include a plurality of pointed vertical spikes on the lower and upper members of the wick positioning assembly.

* * * * *

UNITED STATES PATENT AND TRADEMARK OFFICE
CERTIFICATE OF CORRECTION

PATENT NO. : 4,748,939

DATED : June 7, 1988

INVENTOR(S) : Jesse Cocke, Jr., William J. Gladney, and Alan K. Viets

It is certified that error appears in the above-identified patent and that said Letters Patent are hereby corrected as shown below:

In column 3, line 15; please replace "15" with --16--.

In column 5, line 12; please replace "weage" with --wedge--.

In column 6, line 20; please replace "changed" with --charged--.

In column 6, line 63; please replace "or" with --of--.

Signed and Sealed this

First Day of November, 1988

Attest:

DONALD J. QUIGG

*Attesting Officer*  *Commissioner of Patents and Trademarks*